United States Patent Office 3,207,604
Patented Sept. 21, 1965

3,207,604
HARDENING PHOTOGRAPHIC SILVER
HALIDE EMULSIONS
Emil B. Rauch, Port Dickinson, N.Y., Michael Mizianty, Carbondale, Pa., and Fritz Dersch, Binghamton, N.Y., assignors to General Aniline & Film Corporation, New York, N.Y., a corporation of Delaware
No Drawing. Filed Jan. 11, 1962, Ser. No. 165,661
14 Claims. (Cl. 96—111)

This invention relates to the hardening of gelatin, and especially to the hardening of photographic gelatin and gelatino silver-halide emulsions to yield compositions having an appreciable increase in melting point and good stability on aging with respect to fog, speed, and gradation.

In the preparation of photographic gelatin dispersions and gelatino silver-halide emulsions, it has been the practice to treat the disepersions and emulsions, prior to coating, with a hardening agent so as to reduce the tendency of the gelatin to soften, or to distend during processing of the photographic material containing the gelatin, particularly at temperatures higher that the temperature specified for processing the particular photographic material. Compounds which have been used for hardening gelatin as such or in silver-halide emulsions are formaldehyde, hydroxy aldehydes, acrolein, glyoxal, and derivatives thereof, and mixtures of an aliphatic aldehyde with an aromatic compound conatining at least one nuclear hydroxy substituent group such as phenol, resorcinol, resorcylic aldehyde, and the like. Although formaldehyde and hydroxy aldehydes are satisfactory as hardening agents, these compounds possess the undesirable property of producing excessive fog, desensitization, or flattening of gradation in the processed film. Any hardeners that function by the liberation of formaldehyde will aslo have these deleterious effects as well as that of "after-hardening." Aliphatic aldehydes, with an aromatic compound containing at least one nuclear hydroxy substituent group, induce some increase in the melting point. They fail, however, to give both an appreciable increase in the melting point and good stability upon aging in respect to fog, speed, and gradation.

It has been suggested that nitrogenous methylol derivatives such as methylol ureas, thioureas, guanidines, and the like, are useful as hardeners for gelatin because formaldehyde is liberated when these compounds are heated. The employment of these compounds, coupled with heating them, however, will have a deleterious effect on the photographic properties of the emulsion, especially when of a high speed type.

It has also been suggested that the stability of emulsions hardened by formaldehyde, and other aldehydes, can be improved by the use of hydroxy-benzenes, such as resorcinol, phloroglucinol, resorcylic aldehyde, and the like. However, even though this treatment does lead to some improvement in the stability of the photographic properties on aging, it is not entirely adequate, especially with high speed emulsions. In other words, although aliphatic aldehydes with hydroxy-benzenes induce an increase in the melting point, they invariably cause loss in speed and gradation so that one has to make compromises between hardening and speed. Moreover, by the use of such a combination, only relatively little hardening can be achieved without causing deleterious effects in the photographic characteristics of the emulsion.

It is an object of the present invention to provide a photographic gelatin or a gelatino silver-halide emulsion having an appreciably higher melting point and much better stability on aging than gelatin or gelatino silver-halide emulsions per se.

Another object is to provide gelatin layers and gelatino silver-halide emulsion layers in which the gelatin is not subject to the phenomenon known as "after-hardening."

A further object is to provide a gelatino silver-halide emulsion which will not fog on storage.

A still further object is to provide a gelatino silver-halide emulsion which will be resistant to relatively high processing temperatures without fogging, loss of speed, and loss of gradation.

The foregoing objects are readily accomplished by incorporating into photographic emulsions imidazolones of the general formula:

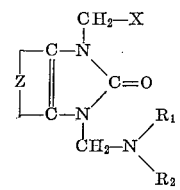

wherein X represents a member selected from the group consisting of

and —OH radicals wherein $R_1$ and $R_2$ when taken alone represents a member selected from the group consisting of hydrogen and alkyl radicals and when $R_1$ and $R_2$ are taken together represent members selected from the group consisting of piperidino, morpholino and thiamorpholino radicals and Z together with the carbon atoms to which it is attached represents an aromatic radical. By the term aromatic radical, it is intended to include organic compounds containing closed rings, which may be either homocyclic and/or heterocyclic.

Exemplary imidazolones characterized by the general formula supra which deserve special mention as suitable for employment in accordance with the invention are those imidazolones characterized by the formula:

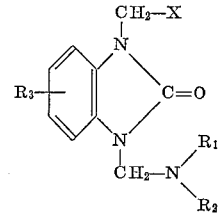

wherein $R_3$ represents members selected from the group consisting of hydrogen, halogen atoms, nitro or alkyl, alkoxy, aryl and aryloxy radicals and $R_1$, $R_2$ and X are as above defined.

Typical imidazolones which deserve particular mention include

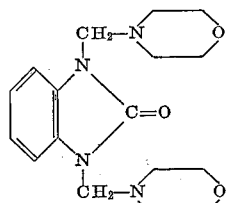

1,3-bismorpholinomethyl-benzimidazolone

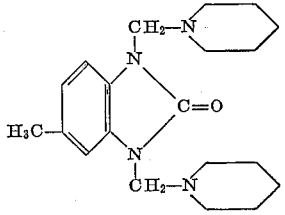

1,3-bispiperidinomethyl-5-methyl-benzimidazolone

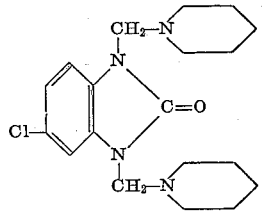

1,3-bispiperidinomethyl-5-chloro-benzimidazolone

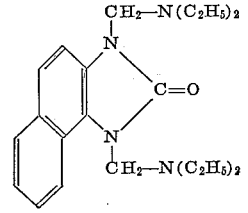

1,3-bisdiethylaminomethyl-4,5-benzo-benzimidazolone

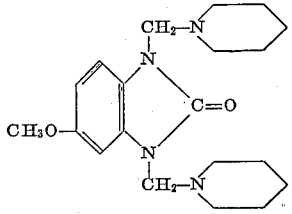

1,3-bispiperidinomethyl-5-methoxy-benzimidazolone

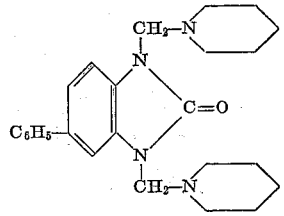

1,3-bispiperidinomethyl-5-phenyl-benzimidazolone

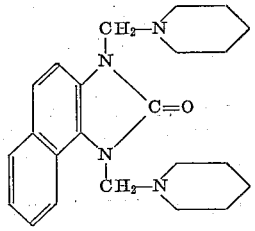

1,3-bispiperidinomethyl-4,5-benzo-benzimidazolone

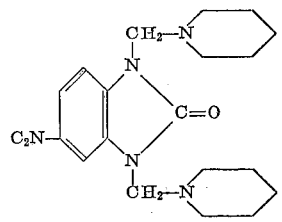

1,3-bispiperidinomethyl-5-nitro-benzimidazolone

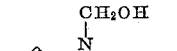

1-hydroxymethyl-3-diethylaminomethyl-benzimidazolone

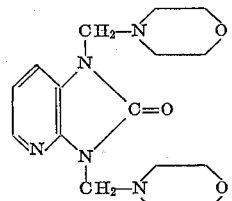

1,3-bismorpholinomethyl-4,5-pyridino-(2,3)-imidazolone

The foregoing compounds are conveniently prepared by the methods disclosed in J. Am. Chem. Soc., vol. 80, page 1657 (1958). Thus, typically, a properly substituted aromatic ortho-diamino derivative is ring closed to the corresponding benzimidazolone with phosgene or urea. The resulting benzimidazolone is subsequently reacted with the proper amine and formaldehyde to provide the desired Mannich base.

The procedures adapted for this step are based on the procedures set forth in Berichte 91, 1423 (1958).

The imidazolone hardening agents can advantageously be added to the gelatin solution or to the emulsion shortly before coating the emulsion on a suitable support such as glass, paper, cellulose, cellulose derivatives or other suitable material.

The hardening agents can also be applied by immersing a photographic film coated with silver halide gelatin emulsions or other gelatin layers such as color filters in a solution of the hardener. The development of optimum characteristics, obviously, will depend on the selection of conditions of temperature, time of immersion, concentration and pH and can be readily determined in each case.

The amount of imidazolone hardening agent to be employed depends on the desired increase in melting point. Substantial increases in melting point of photographic materials have been obtained by adding amounts of imidazolones in the range of from 80 milligrams to 1½ grams per 100 grams of dry gelatin although amounts above and below the above-mentioned ranges can be employed depending on the effect desired.

The following examples will serve to illustrate the practice of the invention:

*Example I*

A 1000 gram sample of a photographic silver halide emulsion containing 75 grams of gelatin was prepared in a conventional manner. It was then readied for coating on film base, melted at 40° C., necessary coating finals were added such as sensitizing dyes, stabilizers and formaldehyde as a hardener. A control was coated containing no hardeners. One set of experiments was coated containing in addition to formaldehyde, different quantities of hardener, 1,3-bispiperidini-methyl-5-methyl benzimidazolone. Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H., 120° F.).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 35 | 38 |
| 200 | 0 | 56 | >100 |
| 200 | 160 | 65 | >100 |
| 200 | 300 | 75 | >100 |
| 200 | 600 | 81 | >100 |
| 200 | 1,200 | 89 | >100 |
| 0 | 600 | 41 | 96 |
| 0 | 1,200 | 68 | >100 |

The hardener used in this example was prepared as follows: A suspension of 2 grams of 5-methylbenzimidazolone, prepared in the manner set forth at J. Amer. Chem. Soc. 80, 1657 (1958), in 20 cc. of ethanol was prepared. To the suspension was added 4.4 cc. of piperidine and 4.6 cc. formalin (38–40%). The mixture became hot and a clear solution was formed. The solution was allowed to stand at room temperature for several days. Crystallization of the product was caused by the addition of a small amount of water and the cooling of the resultant solution at 0° C. for several hours. The white crystalline product was filtered, washed with water, dried and recrystallized from petrol ether (B.P. 90–100° C.).

*Example II*

A 1000 gram sample of a photographic silver halide emulsion containing 75 grams gelatin was prepared in a conventional manner. It was then readied for coating on film base, melted at 40° C. necessary coating finals were added such as sensitizing dyes, stabilizers and formaldehyde as a hardener. A control was coated containing no hardeners. One set of experiments was coated containing in addition to formaldehyde, different quantities of hardener, 1,3-bismorpholinomethyl-benzimidazolone prepared according to Berichte 91, 1432 (1958). Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H., 120° F).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 35 | 38 |
| 200 | 0 | 50 | >100 |
| 200 | 600 | 64 | >100 |
| 200 | 1,200 | 73 | >100 |
| 0 | 600 | 36 | 84 |
| 0 | 1,200 | 36 | 90 |

*Example III*

A 1000 gram sample of a photographic silver halide emulsion containing 75 grams of gelatin was prepared in a conventional manner. It was then readied for coating on film base, melted at 40° C., necessary coating finals were added such as sensitizing dyes, stabilizers and formaldehyde as a hardener. A control was coated containing no hardeners. One set of experiments was coated containing in addition to formaldehyde, different quantities of hardener, 1,3-bispiperidinomethyl-5-chlorobenzimidazolone prepared in a manner similar to Example I using instead 3.7 grams of 5-chloro-benzimidazolone, 6.6 cc. of piperidine and 6.9 cc. of formalin (40%) and recrystallizing the product from 50% ethanol. Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H., 120° F).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 36 | 39 |
| 200 | 0 | 42 | 89 |
| 200 | 600 | 65 | >100 |
| 200 | 1,200 | 76 | >100 |
| 0 | 600 | 36 | 49 |
| 0 | 1,200 | 37 | 81 |

*Example IV*

A 1000 gram sample of a photographic silver halide emulsion containing 75 grams of gelatin was prepared in a conventional manner. It was then readied for coating on film base, melted at 40° C., necessary coating finals were added such as sensitizing dyes, stabilizers and formaldehyde as a hardener. A control was coated containing no hardeners. One set of experiments was coated containing in addition to formaldehyde, different quantities of hardener, 1-hydroxymethyl-3-dimethylaminomethylbenzimidazolone, prepared according to Berichte 91, 1432 (1958). Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H., 120° F.).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 36 | 39 |
| 200 | 0 | 42 | 90 |
| 200 | 80 | 55 | 93 |
| 200 | 160 | 63 | 95 |
| 200 | 300 | 72 | >100 |
| 200 | 600 | 77 | >100 |
| 200 | 1,200 | 92 | >100 |
| 0 | 600 | 37 | 80 |

*Example V*

A 1000 gram sample of a photographic silver halide emulsion containing 75 grams of gelatin was prepared in a conventional manner. It was then readied for coating on film base, melted at 40° C., necessary coating finals were added such as sensitizing dyes, stabilizers and formaldehyde as a hardener. A control was coated containing no hardeners. One set of experiments was coated containing in addition to formaldehyde, different quantities of hardener, 1,3-bisdiethylaminomethyl-4,5 - benzo-benzimidazolone, prepared in a manner similar to Example I using instead 1.8 grams of 4,5-benzo-benzimidazolone, 3.11 cc. of diethylamine and 2.3 cc. of formalin (40%) and recrystallizing the product from petroleum ether. Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H., 120° F.).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 33 | 35 |
| 200 | 0 | 45 | 87 |
| 200 | 300 | 60 | 90 |
| 200 | 600 | 65 | 90 |
| 200 | 1,200 | 73 | 90 |
| 0 | 600 | 34 | 65 |
| 0 | 1,200 | 36 | 67 |

*Example VI*

A 1000 gram sample of a photographic silver halide emulsion containing 75 grams of gelatin was prepared in a conventional manner. It was then readied for coating on film base, melted at 40° C., necessary coating finals were added such as sensitizing dyes, stabilizers and formaldehyde as a hardener. A control was coated containing no hardeners. One set of experiments was coated containing in addition to formaldehyde, different quantities of hardener, 1,3-bispiperidinomethyl-5-phenyl-benzimidazolone, prepared in a manner similar to Example I using instead 1 gram of 5-phenol-benzimidazoline, 2 cc. of piperidine and 2.3 cc. of formalin (40%) and recrystallizing the product from methanol. Another set of experiments contained different quantities of said hardener, but no formaldehyde. After the coating, the material was dried in a conventional manner. Small test strips were cut and placed in a glass beaker filled with water. Then the temperature of the water was raised 1° C. per minute.

The temperature at which the emulsion melted or disintegrated was noted as the melting point. Since the melting point of the fresh material does not represent the performance after storage, a parallel set of test strips was also tested after having been subjected to an oven test (53% R.H. 120° F.).

| Quantity of Formaldehyde, mg. | Quantity of Imidazolone, mg. | Melting Point of Fresh Test, ° C. | Melting Point of Oven Test, ° C. |
|---|---|---|---|
| 0 | 0 | 36 | 39 |
| 200 | 0 | 50 | 90 |
| 200 | 600 | 73 | 90 |
| 200 | 1,200 | 73 | 90 |
| 0 | 600 | 35 | 62 |
| 0 | 1,200 | 36 | 89 |

Various modifications of the invention will occur to persons skilled in the art. Thus, it is evident that in lieu of using the compounds of the examples, any of the compounds mentioned above can be employed with similar results. Therefore, it is not intended that the invention be limited in the patent granted except as necessitated by the appended claims.

What is claimed is:

1. A photosensitive element comprising a support and a gelatin silver halide emulsion coated thereon, said emulsion containing as a hardening agent an imidazolone of the general formula:

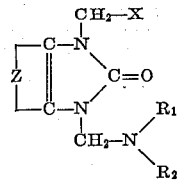

wherein X represents a member selected from the group consisting of

and —OH radicals wherein $R_1$ and $R_2$ when taken alone represent a member selected from the group consisting of hydrogen and alkyl radicals and when $R_1$ and $R_2$ are taken together represent members selected from the group consisting of piperidino, morpholino and thiamorpholino radicals and Z together with the carbon atoms to which it is attached represents an aromatic radical.

2. A photosensitive element comprising a support and a gelatin silver halide emulsion coated thereon, said emulsion containing as a hardening agent therefor 1,3-bis-morpholinomethyl-benzimidazolone.

3. A photosensitive element comprising a support and a gelatin silver halide emulsion coated thereon, said emulsion containing as a hardening agent therefor 1,3-bis-piperidinomethyl-5-methyl-benzimidazolone.

4. A photosensitive element comprising a support and a gelatin silver halide emulsion coated thereon, said emulsion containing as a hardening agent therefor 1,3-bis-piperidinomethyl-5-chloro-benzimidazolone.

5. A photosensitive element comprising a support and a gelatin silver halide emulsion coated thereon, said emulsion containing as a hardening agent therefor 1,3-bis-diethylaminomethyl-4,5-benzo-benzimidazolone.

6. A photosensitive element comprising a support and a gelatin silver halide emulsion coated thereon, said emulsion containing as a hardening agent therefor 1,3-bis-piperidinomethyl-5-methoxy-benzimidazolone.

7. A photosensitive element comprising a support and a gelatin silver halide emulsion coated thereon, said emulsion containing as a hardening agent therefor 1,3-bis-piperidinomethyl-5-phenyl-benzimidazolone.

8. A photosensitive element comprising a support and a gelatin silver halide emulsion coated thereon, said emulsion containing as a hardening agent therefor 1,3-bis-piperidinomethyl-4,5-benzo-benzimidazolone.

9. A photosensitive element comprising a support and a gelatin silver halide emulsion coated thereon, said emulsion containing as a hardening agent therefor 1,3-bis-piperidinomethyl-5-nitro-benzimidazolone.

10. A photosensitive element comprising a support and a gelatin silver halide emulsion coated thereon, said emulsion containing as a hardening agent therefor 1-hydroxymethyl-3-diethylaminomethyl-benzimidazolone.

11. A photosensitive element comprising a support and a gelatin silver halide emulsion coated thereon, said emulsion containing as a hardening agent therefor 1,3-bis-morpholinomethyl-4,5-pyridino-(2,3)-imidazolone.

12. A photosensitive element comprising a support and a gelatin silver halide emulsion coated thereon, said emulsion containing as a hardening agent formaldehyde and 1,3-bismorpholinomethyl-benzimidazolone.

13. The method of producing a hardened gelatin layer in a photographic silver halide element having, at most, little after hardening tendency which comprises mixing with said layer, prior to coating upon a support an imidazolone of the general formula:

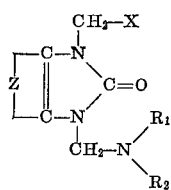

wherein X represents a member selected from the group consisting of

and —OH radicals wherein $R_1$ and $R_2$ when taken alone represent a member selected from the group consisting of hydrogen and alkyl radicals and when $R_1$ and $R_2$ are taken together represent members selected from the group consisting of piperidino, morpholino and thiamorpholino radicals and Z together with the carbon atoms to which it is attached represents an aromatic radical.

14. The method of producing a hardened gelatin layer in a photographic silver halide element having, at most, little after hardening tendency which comprises mixing with said layer, prior to coating upon a support a hardening means comprising formaldehyde and an imidazolone of the general formula:

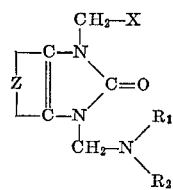

wherein X represents a member selected from the group consisting of

and —OH radicals wherein $R_1$ and $R_2$ when taken alone represent a member selected from the group consisting of hydrogen and alkyl radicals and when $R_1$ and $R_2$ are taken together represent members selected from the group consisting of piperidino, morpholino and thiamorpholino radicals and Z together with the carbon atoms to which it is attached represents an aromatic radical.

References Cited by the Examiner
UNITED STATES PATENTS 2,154,895   4/39   Fricke et al. _____ 96—111
2,732,316   1/56   July et al. _____ 96—111

NORMAN G. TORCHIN, *Primary Examiner.*

LOUISE P. QUAST, *Examiner.*